United States Patent [19]

Yoshimura

[11] Patent Number: 4,891,497
[45] Date of Patent: Jan. 2, 1990

[54] SOLDERING IRON TEMPERATURE REGULATOR

[75] Inventor: Hiroshi Yoshimura, Oriono, Japan

[73] Assignee: Hakko Metal Industries Limited, Osaka, Japan

[21] Appl. No.: 235,226

[22] Filed: Aug. 23, 1988

[30] Foreign Application Priority Data

Apr. 2, 1988 [JP] Japan .................................. 63-82054

[51] Int. Cl.$^4$ .............................................. H05B 1/02
[52] U.S. Cl. ................................... 219/241; 219/506; 219/505; 219/494; 374/1; 324/63
[58] Field of Search ................................ 219/240-242, 219/494, 497, 499, 501, 505, 506, 507-509; 374/1; 324/63, 83 D, 78 D

[56] References Cited

U.S. PATENT DOCUMENTS

| | | | |
|---|---|---|---|
| 4,055,744 | 10/1977 | Fortune | 219/241 |
| 4,075,882 | 2/1978 | Waldron | 374/1 |
| 4,198,849 | 4/1980 | Seiss et al. | 374/1 |
| 4,218,916 | 8/1980 | Mutziger | 374/1 |
| 4,293,916 | 10/1981 | Del Re et al. | 374/1 |
| 4,443,117 | 4/1984 | Muramoto et al. | 374/1 |
| 4,475,823 | 10/1984 | Stone | 374/1 |
| 4,479,726 | 10/1984 | Townsend | 374/1 |
| 4,761,539 | 8/1988 | Carmean | 219/497 |
| 4,766,289 | 8/1988 | Santoro et al. | 219/497 |

*Primary Examiner*—M. H. Paschall
*Attorney, Agent, or Firm*—Mason, Fenwick & Lawrence

[57] ABSTRACT

A soldering iron temperature regulator capable of calibrating the measuring error of the temperature sensor for detecting the tip temperature of a soldering iron at ordinary temperature. It comprises a temperature control part for adjusting the heating temperature of the heater on the basis of the set value of a temperature setting part and the measured temperature by a temperature sensor, a variable resistor connected to the temperature sensor, and a calibration circuit for matching the tip measured temperature by the temperature sensor with the ambient temperature of the tip at room temperature, in which after matching the measured temperature by the temperature sensor with the ordinary ambient measured temperature by the output adjustment of the calibration circuit, the heating temperature of the tip is set to a specified temperature by the temperature setting parts, and this value is entered into the temperature control part.

4 Claims, 4 Drawing Sheets

TEMPERATURE-RESISTIVITY GRAPH OF SENSOR

RESISTANCE ERROR GRAPH OF SENSOR

SOLDERING IRON TEMPERATURE REGULATOR

BACKGROUND OF THE INVENTION

1. Field of the Invention

This invention relates to a measuring technology of the tip temperature of a soldering iron, and more particularly to a soldering iron temperature regulator capable of calibrating the measuring error of a temperature sensor at ordinary temperature.

2. Description of the Prior Art

The assembling work of various electric appliances using electronic parts such as ICs requires a job of soldering semiconductor devices which are not resistant to heat. In soldering job, therefore, it is important to be careful so that the tip temperature of the soldering iron may not exceed the specified temperature, in particular.

Recently various soldering irons capable of controlling the tip temperature constant have been developed (e.g. the Japanese Laid-open Patent Sho. No. 61-37368).

In this type of soldering iron, generally, the heater is heated according to a preset temperature, and the iron tip is heated accordingly, and the temperature of this heated iron tip is detected by a temperature sensor, and this detected temperature is compared with the preset temperature, and as a result of this comparison, the temperature is controlled depending on the difference of the both temperatures, so that the tip temperature may be kept always at the preset temperature.

Meanwhile, in this type of soldering iron, it is necessary to calibrate the intrinsic measuring error of the temperature sensor when replacing the temperature sensor or at the time of shipping inspection.

Conventionally, this calibration of intrinsic measuring error of temperature sensor was conducted on all soldering irons in the following procedure.

That is, on all soldering irons, the heater of the iron tip is energized to heat the tip to an operating temperature, and the tip temperature is measured by the temperature sensor. As a result, if the temperature measured by the temperature sensor does not coincide with the preset temperature, the measuring error of the temperature sensor is calibrated.

In such method, however, since it takes much time for heating by the iron tip heater, a long time is required for calibration of the measuring error of temperature sensor, and the job efficiency is very poor.

Besides, in this calibration job, the iron tip is darkened due to the heating of the tip by energization of the heater, and the product value as the soldering iron is lowered. In fact, due to this discoloration, the users often misunderstand that second-hand pieces are mixed in the products, not knowing such procedure, and the manufacturers have to settle the claims.

BRIEF SUMMARY OF THE INVENTION

In the light of the above-discussed conventional problems, it is hence a primary object of this invention to present a novel soldering iron temperature regulator solving all the problems stated above by calibrating the measuring error of temperature sensor at ordinary temperature.

It is another object of this invention to present a soldering iron temperature regulator capable of measuring the tip temperature of soldering iron precisely, controlling the heater heating temperature at a preset temperature and keeping the tip temperature properly, by simply calibration to match the measured temperature of the temperature sensor with the ambient measured temperature of the soldering tip at room temperature.

It is another object of this invention to present a soldering iron temperature regulator capable of calibrating to match the detected temperature of the temperature sensor with the ambient measured temperature in a short time, by energizing the heater after the measured temperature of the temperature sensor displayed in the temperature indicator is matched with the ambient measured temperature, and then automatically controlling the tip temperature to the set value.

It is a further different object of this invention to present a soldering iron temperature regulator capable of calibrating the temperature at ordinary temperature by using a thermometer or the like easily, inspecting the products of soldering irons at the time of shipping only by varying the resistance of the temperature sensor while the power supply to the heater is being cut off, and avoiding darkening of the iron tip.

In order to achieve the above and other objects, the soldering iron temperature regulator of this invention comprises a soldering iron composed of a heater for heating the tip and a resistance bulb and also having a temperature sensor for measuring the tip temperature built in near the tip, a temperature setting part for varying the heating temperature of the heater, and setting the tip temperature of the soldering iron, a temperature display part for indicating the preset temperature of this temperature setting part and also indicating the detected temperature by the temperature sensor, a temperature control part for regulating the heating temperature of the heater depending on the preset value of the temperature setting part and the detected temperature of the temperature sensor, a variable resistor connected to the temperature sensor, a calibration circuit for matching the measured temperature indicated in the temperature display part with the ambient temperature of the tip of the soldering iron, and a changeover switch for cutting off the power supply to the heater when a supply voltage is applied to the temperature control part.

The features of this invention, as well as the objects thereof, will be more clearly understood and appreciated from the following detailed description and the claims given in conjunction with the accompanying drawings.

DETAILED DESCRIPTION OF THE PREFERRED EMBODIMENT

Figure 1:
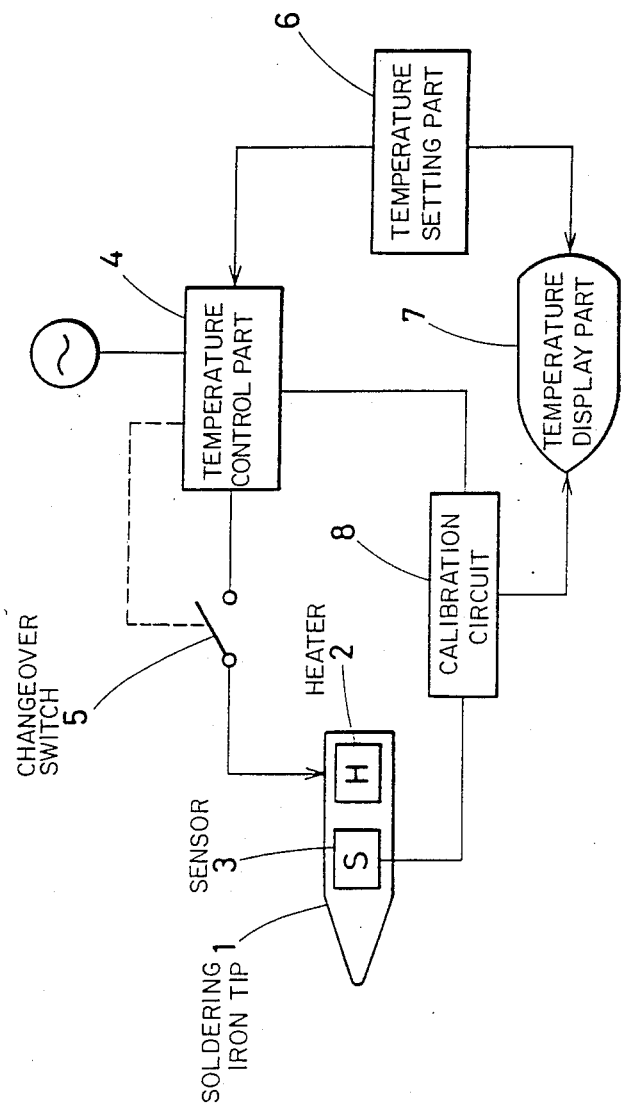
FIG. 1 is a block diagram showing soldering iron temperature regulator according to one of the embodiments of this invention.
Figure 2:
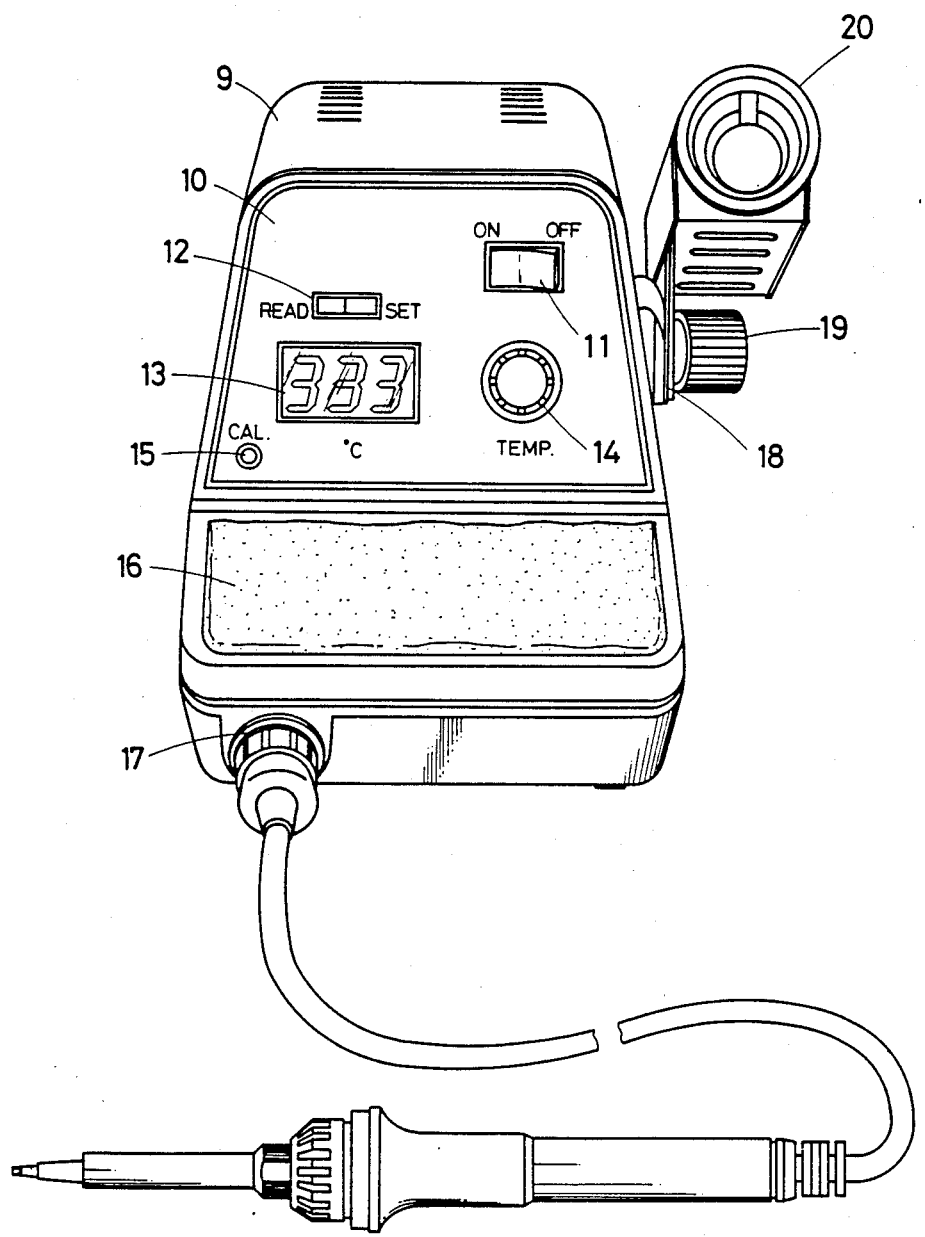
FIG. 2 is a perspective view showing the main body of the same temperature regulator.

A soldering iron temperature regulator according to one of the embodiments of this invention is shown in FIG. 1, and this temperature regulator is disposed in a soldering iron main body 9 as shown in FIG. 2. The soldering iron has a tip 1, in which a heater 2 and a temperature sensor 3 are closely incorporated.

To a temperature control part 4 which receives a commercial alternating-current power supply, the heater 2 of the tip 1 is connected by way of a changeover switch 5. A temperature setting part 6 is also connected to this temperature control part 4, and a temperature display part 7 is connected to the temperature setting part 6. Among the temperature display part 7, the temperature sensor 3 of the tip 1, and the temperature control part 4, a calibration circuit 8 is connected.

The soldering iron control and display unit 9 comprises, as shown in FIG. 2, a pushbutton type power switch 11, pushbutton type select switch 12, digital type display window 13, rotary knob type setting switch 14, and screw type calibration part 15, which are mounted on a front panel 10. At the front part of the unit 9, a step is formed, in which a sponge tray 16 is disposed. There is a socket 17 beneath this step, and the connection plug of the soldering iron is detachably inserted into this socket. Seeing toward FIG. 2, at the right side of the control and display unit 9, an arm part 18 is projected, and a cooling holder 20 for holding the soldering iron is attached through a tightening screw 19.

As the heater 2, any device that is linear in the gradient of temperature characteristic, fast in temperature rise rate even in high temperature region, and made of material capable of maintaining a stationary temperature easily may be used, and a ceramic heater is preferably used in this embodiment.

Figure 3:
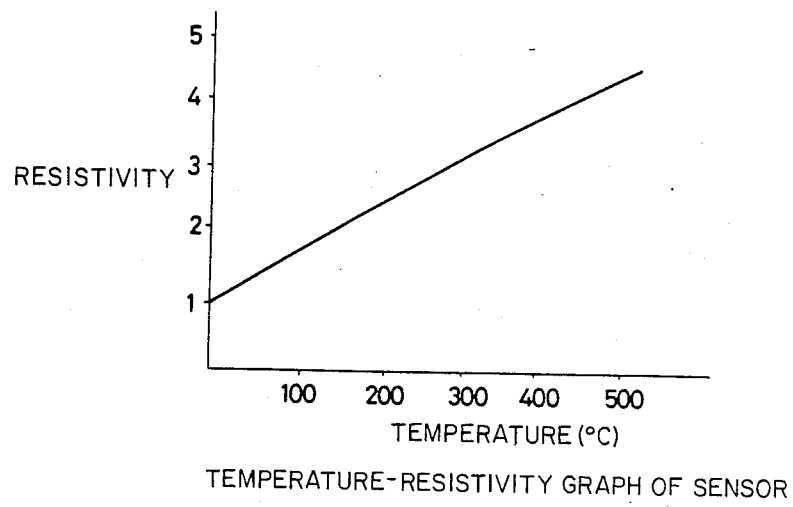
FIG. 3 is a diagram showing the temperature-resistivity curve of the temperature sensor of the same temperature regulator.
Figure 4:
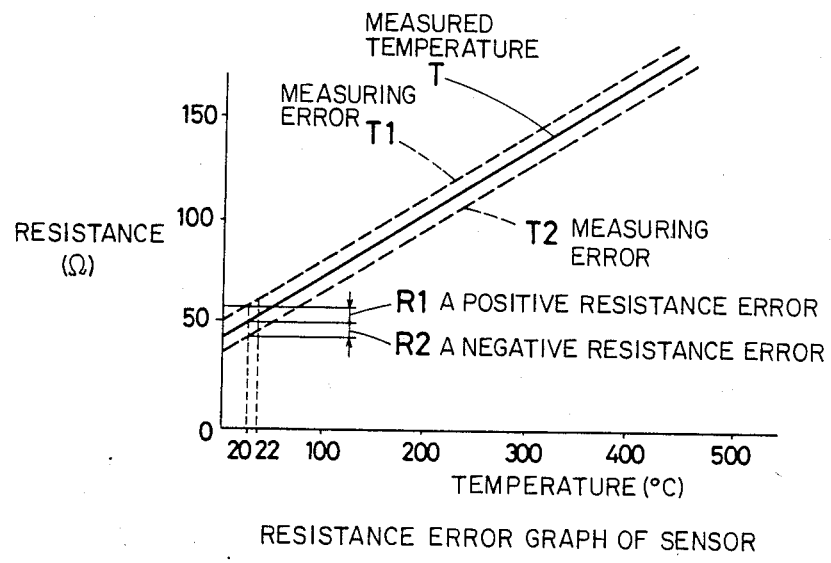
FIG. 4 is a diagram showing the resistance error of the same temperature sensor.

As the temperature sensor 3, as shown in the temperature-resistivity graph in FIG. 3, same as the heater 2, any device that is excellent in temperature characteristic even in high temperature region and is linear in the resistance change depending on the tip temperature may be used, the resistance bulb of platinum or the like, and ceramic temperature sensor and the like are preferable.

The temperature control part 4 is for regulating the heating temperature of the heater 2, and it is composed of, though not shown, a known operational amplifier, heater drive unit and others.

To this operational amplifier, the output voltage from the temperature sensor 3 and the output voltage based on the setting by the temperature setting part 6 are introduced. The operational amplifier delivers the voltage corresponding to the difference of these voltages to the heater drive unit to control the heating temperature, and the temperature of the tip 1 of the soldering iron is thus maintained at a constant temperature.

To this heater unit is introduced a reference voltage for operating the changeover switch 5 by using a comparator. When an alternating-current voltage is applied to the temperature control part 4 from the power switch 11 side, an OFF signal is delivered to the changeover switch 5, and when a voltage of specified level is applied from the temperature setting part 6, an ON signal is delivered to the changeover switch 5.

As this changeover switch 5, in this embodiment, a triac is used, and the action signal of the heater drive unit is introduced into the gate. The changeover switch 5 is turned on or off depending on the output level of the action signal, so that the passing of current to the heater 2 is controlled.

The temperature control part 4, meanwhile, may be composed to comprise a microcomputer, instead of the operational amplifier and heater drive unit shown above. That is, the reference value for actuating the changeover switch 5 or the setting values of the temperature setting part 6 are stored in the memory of the microcomputer, and, accordingly, when an alternating-current voltage is introduced into this temperature control part 4, the changeover switch 5 is operated, and the output voltage corresponding to the detected value based on the measured temperature of the temperature sensor 3 is applied from the temperature control part 4 to the heater 2, thereby controlling the heating temperature.

The temperature setting part 6 has a variable resistor, and this variable resistor can be adjusted by the setting switch 14 provided with temperature graduations. The temperature setting part 6 is designed to increase the resistance roughly in proportion within the temperature range (200° C. to 500° C.) to be used as soldering iron, and the temperature set value of the temperature setting part 6 is delivered to the temperature control part 4 and temperature display part 7.

This temperature setting part 6 can also turn on and off the heater 2. That is, when the set value of the temperature setting part 6 is over 200° C., an ON signal is delivered from the heater drive unit of the temperature control part 4 to the changeover switch 5, and the heater 2 is energized, and when, on the other hand, the set value is returned to the minimum temperature, the current supply to the heater 2 is cut off.

The temperature display part 7 comprises the display window 13 made of LED, and the select switch 12 having the setting side (SET) and measuring side (READ). By the changeover operation of the select switch 12, the set temperature of the temperature setting part 6, or the tip temperature detected by the temperature sensor 3 is selectively displayed in the display window 13.

The calibration circuit 8 is to calibrate the measuring error of the tip temperature by the temperature sensor 3, and it has a variable sensor capable of increasing or decreasing the resistance by means of the calibration part 15. By the fine adjustment by the variable resistor, for example, this resistance is selected so that the ambient measured temperature of the tip 1 measured by a thermometer or the like at ordinary room temperature, and the detected temperature by the temperature sensor 3 displayed on the temperature display part 7 may be matched, so that the temperature of the tip 1 appearing as the resistance change of the temperature sensor 3 may be accurately displayed on the temperature display part 7.

Of thus composed temperature regulator, the temperature adjustment and temperature control of the soldering iron are described below.

First, the setting of the temperature setting part 6 is determined at the minimum temperature, and an alternating-current voltage is applied to the temperature control part 4. Then the changeover switch 5 is turned off, and the current supply to the heater 2 of the soldering iron 1 is cut off.

In succession, the ambient temperature of the tip 1 at room temperature is measured by a thermometer, and the detected temperature of the temperature sensor 3 of the soldering iron is displayed in the temperature display part 7. At this time, in the temperature display part 7, usually, a different temperature from the measured temperature T (measured value) by the thermometer is displayed due to the intrinsic measuring error of the temperature sensor 3.

The measuring errors T1, T2 of the temperature sensor 3 are usually about ±10% of the measured temperature T as shown in the graph of resistance error in FIG.

4. For example, when the room temperature is 20° C., according to the measuring error T1, the indicated temperature of the temperature display part 7 may be nearly 22° C. It shows that the resistance of the temperature sensor 3 is increased, and a plus resistance error $R_1$ occurs ($R_2$ refers to a minus resistance error).

By rotating the calibration part 15 of the main body 9, the variable resistor of the calibration circuit 8 is adjusted, and by lowering the resistance, the indicated temperature at the temperature display part 7 is corrected to 20° C. As a result, the measured temperature showing the tip temperature and the indicated temperature showing the detected temperature by the temperature sensor 3 are matched, and the resistance of the temperature sensor 3 varies depending on the changes in the tip temperature due to heating by the heater 2, so that the temperature of the tip is shown in the temperature display part 7 almost without any measuring error.

This detected temperature is also delivered to the temperature control part 4, and the set temperature and detected temperature are compared in the temperature control part 4, and the heating temperature of the heater 2 is controlled according to the difference between the set temperature and detected temperature. Therefore, the heating temperature of the heater 2 is always controlled at the above set temperature, and the tip 1 is maintained at constant temperature.

Thus, according to this invention, since the measured temperature of the temperature sensor indicated in the display part is first matched with the measured value of the ambient temperature, and then the tip temperature is automatically controlled to the set value by supplying current to the heater, the deviation between the set value and the measured value due to the measuring error of the temperature sensor can be corrected at ordinary temperature, without heating the tip as in the prior art.

Moreover, since the temperature can be calibrated easily at ordinary temperature by using a thermometer or the like, the product inspection at the time of shipping of soldering irons can be effected only by varying the resistance of the temperature sensor while the current feed to the heater is cut off, and it is not necessary to heat the tip according to the setting temperature, so that the conventional problems of darkening of the tip due to heating may be avoided, and that the misunderstanding by the users that the products be second-hand may be effectively prevented.

Meanwhile, the practical embodiment explained in the detailed description above is only intended to illustrate the technical aspect of this invention, and hence this invention should not be limited to this embodiment alone and not be understood in a narrow sense, but it should be interpreted in a wide sense so as to be executed variously within the spirit of the invention and the scope of the claims herein.

What is claimed is:

1. A soldering iron temperature regulator comprising:
    a soldering iron composed of a heater for heating its tip and a resistance bulb, said soldering iron having a temperature sensor for measuring the tip temperature incorporated near the tip;
    a temperature setting means for setting the tip temperature of said soldering iron by varying the heating temperature of said heater;
    a temperature display means for displaying the set temperature of said temperature setting means, and the temperature detected by said temperature sensor;
    a temperature control means for adjusting the heating temperature of said heater on the basis of the set value of said temperature setting means and the detected temperature of said temperature sensor;
    a calibration circuit having a variable resistor connected to said temperature sensor for matching the measured temperature displayed in said temperature display means with the ambient tip temperature when the tip of said soldering iron is at room temperature; and
    a changeover switch for cutting off the current supply to said heater when a supply voltage is applied to said temperature control part.

2. A soldering iron temperature regulator according to claim 1, wherein said temperature sensor is made of a material which has a linear temperature gradient characteristic, and is linear in the resistance change depending on the tip temperature.

3. A soldering iron temperature regulator according to claim 2, wherein the temperature sensor is made of platinum.

4. A soldering iron temperature regulator according to claim 2, wherein said temperature sensor is a ceramic temperature sensor.

* * * * *